US010088993B2

(12) United States Patent
Hall et al.

(10) Patent No.: US 10,088,993 B2
(45) Date of Patent: Oct. 2, 2018

(54) USER INTERFACE FOR CONTROLLING DATA NAVIGATION

(71) Applicant: eBay Inc., San Jose, CA (US)

(72) Inventors: Christopher Michael Hall, San Jose, CA (US); Matthew Bret MacLaurin, Santa Cruz, CA (US)

(73) Assignee: eBay Inc., San Jose, CA (US)

( * ) Notice: Subject to any disclaimer, the term of this patent is extended or adjusted under 35 U.S.C. 154(b) by 202 days.

(21) Appl. No.: 14/985,535

(22) Filed: Dec. 31, 2015

(65) Prior Publication Data

US 2016/0291848 A1    Oct. 6, 2016

Related U.S. Application Data

(60) Provisional application No. 62/141,702, filed on Apr. 1, 2015.

(51) Int. Cl.
*G06F 3/048* (2013.01)
*G06F 3/0484* (2013.01)
*G06F 3/0481* (2013.01)
*G06F 3/0483* (2013.01)
*G06F 3/0488* (2013.01)

(52) U.S. Cl.
CPC ........ *G06F 3/04845* (2013.01); *G06F 3/0483* (2013.01); *G06F 3/04817* (2013.01); *G06F 3/04847* (2013.01); *G06F 3/04883* (2013.01); *G06F 3/04886* (2013.01)

(58) Field of Classification Search
CPC ................................................ G06F 3/04817
USPC ..................................................... 715/773
See application file for complete search history.

(56) References Cited

U.S. PATENT DOCUMENTS

| 5,760,773 | A | 6/1998 | Berman et al. |
| 6,177,945 | B1 | 1/2001 | Pleyer et al. |
| 6,515,687 | B1 | 2/2003 | Wynn |
| 7,116,340 | B2 | 10/2006 | Van Liere |
| 8,408,997 | B2 | 4/2013 | Miyagawa et al. |
| 8,533,629 | B2 | 9/2013 | Russo |
| 8,593,420 | B1 | 11/2013 | Buuck |
| 8,799,817 | B2 | 8/2014 | Koradi |
| 8,965,579 | B2 | 2/2015 | Wang et al. |
| 9,261,994 | B2 * | 2/2016 | Lee .......................... G06F 3/016 |

(Continued)

FOREIGN PATENT DOCUMENTS

WO    WO-2016160937 A1    10/2016

OTHER PUBLICATIONS

"International Application Serial No. PCT/US2016/024939, International Search Report dated Jul. 1, 2016", 3 pgs.

(Continued)

*Primary Examiner* — William Titcomb
(74) *Attorney, Agent, or Firm* — Wolfe-SBMC

(57) ABSTRACT

Systems and methods for navigation control for mobile devices are provided. In example embodiments, a navigation system causes presentation of a navigation icon at a user interface. Navigation between a plurality of pages at the user interface is initiated with a single tap and hold action. In response to a drag motion, following the single tap and hold action without releasing the hold action, information display at the user interface is adjusted, thereby enabling navigating between multiple information content with a single tap, hold, and drag action of the user.

15 Claims, 8 Drawing Sheets

(56) References Cited

U.S. PATENT DOCUMENTS

| | | | |
|---|---|---|---|
| 9,639,241 B2* | 5/2017 | Penha | G06F 17/30852 |
| 9,817,571 B2* | 11/2017 | Lee | G06F 3/04886 |
| 2002/0027571 A1 | 3/2002 | Matthews, III et al. | |
| 2003/0013959 A1 | 1/2003 | Grunwald et al. | |
| 2003/0179189 A1 | 9/2003 | Lira | |
| 2004/0130525 A1 | 7/2004 | Suchocki | |
| 2005/0114796 A1* | 5/2005 | Bast | G06F 3/0338 715/856 |
| 2006/0070007 A1 | 3/2006 | Cummins et al. | |
| 2007/0192731 A1 | 8/2007 | Townsend et al. | |
| 2008/0163053 A1 | 7/2008 | Hwang et al. | |
| 2008/0163119 A1 | 7/2008 | Kim et al. | |
| 2008/0309626 A1 | 12/2008 | Westerman et al. | |
| 2010/0088654 A1 | 4/2010 | Henhoeffer | |
| 2010/0095240 A1 | 4/2010 | Shiplacoff et al. | |
| 2010/0115452 A1 | 5/2010 | Chabot et al. | |
| 2010/0156813 A1 | 6/2010 | Duarte et al. | |
| 2010/0229130 A1 | 9/2010 | Edge et al. | |
| 2011/0035700 A1 | 2/2011 | Meaney et al. | |
| 2011/0167380 A1 | 7/2011 | Stallings et al. | |
| 2011/0248928 A1 | 10/2011 | Michaelraj | |
| 2011/0285636 A1 | 11/2011 | Howard et al. | |
| 2012/0169610 A1 | 7/2012 | Berkes et al. | |
| 2012/0313977 A1 | 12/2012 | Kwon | |
| 2013/0024806 A1 | 1/2013 | Funabashi et al. | |
| 2013/0055119 A1 | 2/2013 | Luong | |
| 2014/0098038 A1 | 4/2014 | Paek et al. | |
| 2014/0125589 A1 | 5/2014 | Kim et al. | |
| 2014/0189578 A1 | 7/2014 | Shuttleworth et al. | |
| 2014/0195905 A1 | 7/2014 | Dodge | |
| 2014/0267135 A1 | 9/2014 | Chhabra | |
| 2014/0282013 A1 | 9/2014 | Amijee | |
| 2015/0103001 A1 | 4/2015 | Li et al. | |

OTHER PUBLICATIONS

"International Application Serial No. PCT/US2016/024939, Written Opinion dated Jul. 7, 2016", 4 pgs.

"IPhone 6 Plus—GTA San Andreas Gameplay", TechCloud. YouTube. YouTube, [Online] retrieved from the Internet: <https://www.youtube.com/watch?v=CtkkmqfXPhM>, (Sep. 27, 2014).

Nudelman, Greg, "C-Swipe: An Ergonomic Solution to Navigation Fragmentation on Android", Smashing Magazine, (Mar. 25, 2013), 17 pgs.

International Preliminary Report on Patentability received for PCT Application No. PCT/US2016/024939, dated Oct. 12, 2017, 6 pages.

\* cited by examiner

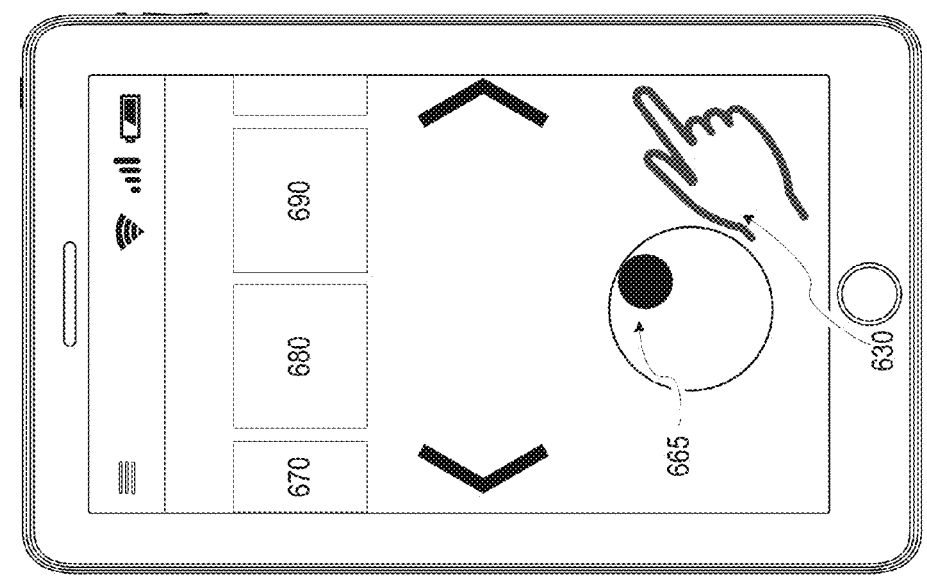
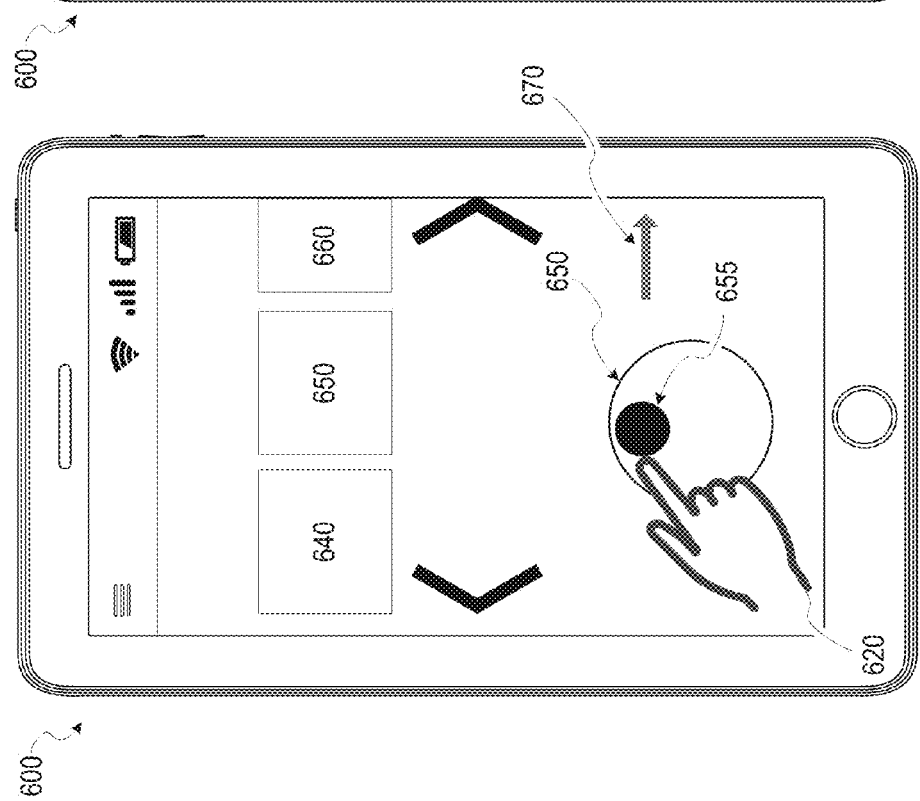
FIG. 6A
FIG. 6B

USER INTERFACE FOR CONTROLLING DATA NAVIGATION

CROSS-REFERENCE TO RELATED APPLICATIONS

This application claims the benefit of priority to Christopher Hall et al. U.S. Provisional Patent Application Ser. No. 62/141,702, entitled "User Interface and Control System for Mobile Navigation," filed on Apr. 1, 2015, which is hereby incorporated by reference herein in its entirety.

TECHNICAL HELD

Embodiments of the present disclosure relate generally to device navigation and more particularly, but not by way of limitation, to user interface for controlling data navigation such as data navigation on mobile devices, computer tablets, and mobile phones.

BACKGROUND

Conventionally, mobile web navigation models have navigation menus hidden behind icons that must be exposed in order for users to view and subsequently navigate. The requirement of having to expose the icons before navigation is not an optimal interface for user interaction. For instance, the user takes an active step (e.g., click or swipe) to expose a navigation menu, then subsequently perform multiple active steps (e.g., clicking the mouse or swiping the fingers multiple times) to navigate through web pages.

BRIEF DESCRIPTION OF THE DRAWINGS

Various ones of the appended drawings merely illustrate example embodiments of the present disclosure and cannot be considered as limiting its scope.

FIGS. 6A-6B are user interface diagrams depicting various example user interfaces for navigation, according to some example embodiments.

Figure 1:
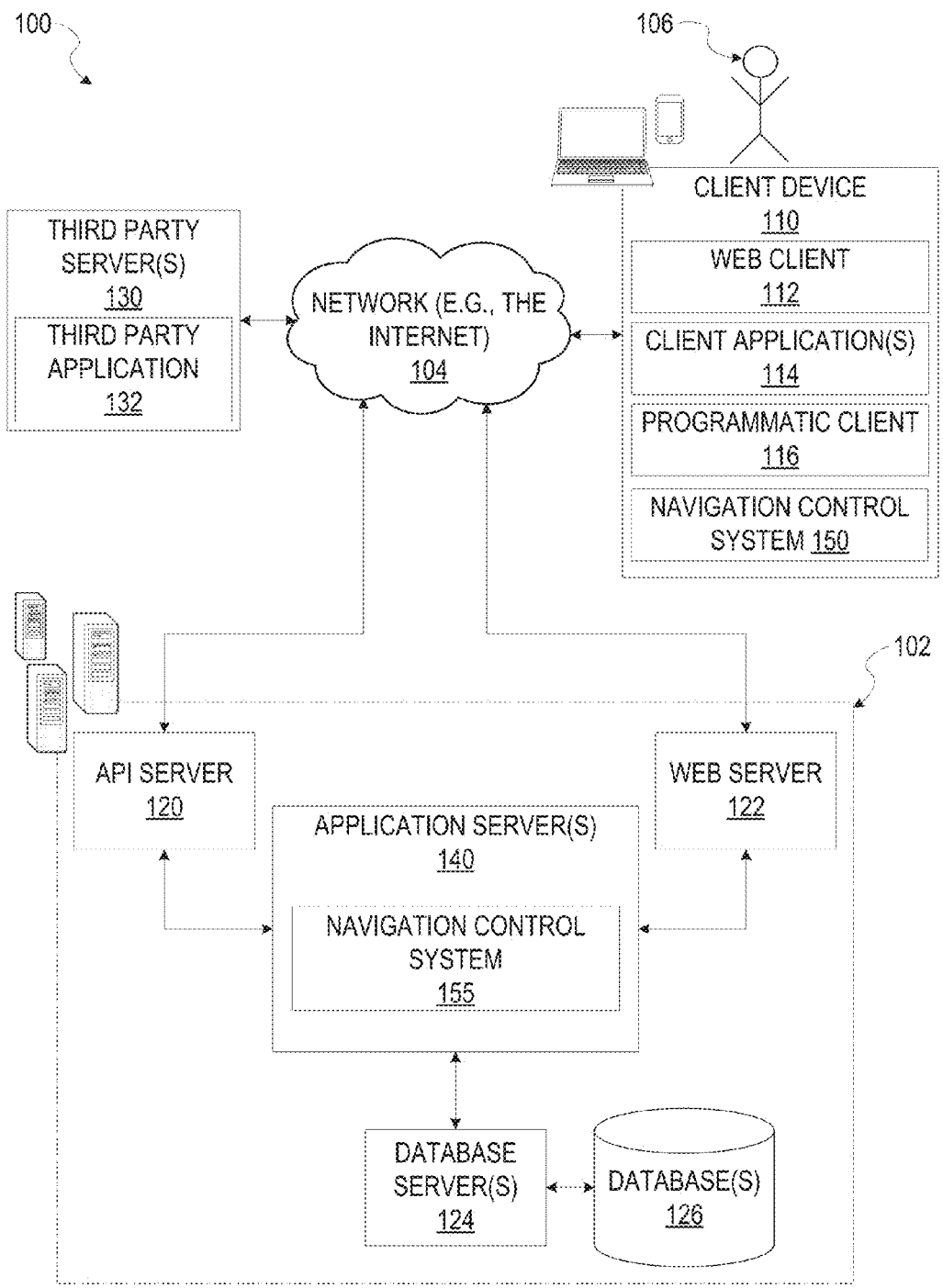
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Common mobile web navigation user interfaces and models offer sub-optimal user interaction. In this context, "navigation" means to move through information displayed or that can be displayed on a device such as mobile devices, computer tablets, mobile phones, and so forth. Often, a navigation menu is hidden behind icons or menu buttons and active steps are required to be taken to cause exposure of the navigation menu in order for users to proceed with using the navigation menu to navigate. For example, many web navigation models hide navigation menus behind a menu button and require several active steps (e.g., taps or swipes via a carousel) to cause exposure of the navigation menu. In other web navigation models, user interaction problems associated with carousel navigation behavior arise due to computer operating systems (e.g., mobile operating system, iOS, Android, etc.) and native browser navigation behavior incompatibilities. For example, a user interaction problem includes triggering a next page functionality by swiping at the edge of the screen where the swipe is targeted at navigating a carousel within the same page.

In various embodiments, systems and methods for navigation on a mobile device are described. The system includes an interactive user interface and control system for navigating web pages and other information presented on a mobile device. The navigation may in the form of navigation between web pages, between items within a single web page (e.g., within content provided in a carousel format), between different applications on a mobile device, and the like. In various embodiments, the system provides a control mechanism for users to navigate a mobile website in a single touch motion, resulting in a navigation that includes multiple actions (e.g., multiple clicks and swipes) within a single touch motion. The menu for navigation is constantly present without the need for a tap or swipe to cause exposure the navigation menu. "Carousel" herein refers to content being displayed at a user interface in an ordered list. In an example, an html structure of a carousel box allows placement of the ordered list of content inside. A specific amount of information can be displayed at a single time within the carousel box and overflow content of the ordered list are hidden. The carousel can be navigated to cause presentation of the remainder hidden ordered list as fully described in association with FIG. 5 and FIGS. 6A and 6B below. Each of the ordered list may be referred to as pages, where at least one page is presented at a time within a carousel and navigation through the carousel is required to reveal the remainder pages hidden from view. In some embodiments, the functionality of the navigation is continuously present and active even when the menu is not visible. To initiate navigation, a tap and hold mechanism is employed within a predefined region, where the user adjusts the navigation by moving a finger around in a joystick-like mechanism. The user can end the adjustment by releasing the finger from the hold, thereby effectively ending the navigation. Throughout the navigation, the finger is not lifted from the interactive user interface. In this way, navigation is achieved using a single touch motion.

In an example embodiment, the control mechanism allows for both vertical and horizontal navigation, in either a 2-dimensional or 3-dimensional space. The navigation control system can be used on various devices with interactive user interfaces, including mobile devices, television, other devices using touchless control technology based on user gestures, and the like. In this way, the system reduces the perceived effort that has to be done to navigate by simplifying the interaction and avoids computer operating system browser swipe navigation issues.

With reference to FIG. 1, an example embodiment of a high-level client-server-based network architecture 100 is shown. A networked system 102 provides server-side functionality via a network 104 (e.g., the Internet or wide area network (WAN)) to a client device 110. In some implementations, a user (e.g., user 106) interacts with the networked system 102 using the client device 110. FIG. 1 illustrates, for example, a web client 112 (e.g., a browser, such as the Internet Explorer® browser developed by Microsoft® Corporation of Redmond, Wash. State), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi') network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of s available for sale, to authenticate a user, to verify a method of payment). Conversely, if the e-commerce site application is not included in the client device 110, the client device 110 can use its web browser to access the e-commerce site (or a variant thereof) hosted on the networked system 102.

In various embodiments, the user (e.g., the user 106) comprises a person, a machine, or other means of interacting with the client device 110. In some example embodiments, the user is not be part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The web client 112 accesses the various systems of the networked system 102 via the web interface supported by the web server 122. Similarly, the programmatic client 116 and client application(s) 114 accesses the various services and functions provided by the networked system 102 via the programmatic interface provided by the API server 120. The programmatic client 116 can, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

An Application Program Interface (API) server 120 and a web server 122 is coupled to, and provide programmatic and web interfaces respectively to, one or more application server(s) 140. The application server(s) 140 hosts a navigation control system 155, which comprises one or more modules or applications and each of which can be embodied as hardware, software, firmware, or any combination thereof. In some embodiments, the client devices 110 include the navigation control system 150 (e.g., the navigation control system 150 may be included independently or in the client applications 114), which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. The database(s) 126 also stores digital good information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by relevant applications of the networked system 102.

In various embodiments, the navigation control system 150 may be in the form of an application and executed on client device 110 such as native applications e.g., applications programmed in Objective-C, Swift, or another suitable language running on iOS™ or applications programmed in Java running on Android™), mobile web applications (e.g., Hyper Text Markup Language-5 (HTML5)), or hybrid applications (e.g., a native shell application that launches an HTML5 session). The navigation control system 150 provides functionality to perform various navigation on a device in response to a user input action. In some embodiments, the user input is a single touch motion, where the single touch motion is a tap and hold on a screen presenting a user interface. During the hold, the user may drag the finger in any direction to cause navigation of presented content. Navigation control parameters such as speed, direction, resistance, and sensitivity are affected based on the position of the touch and hold motion on the screen of the device, the relative speed of the drag of the finger, the content present, and the like. It is noted that the user input can be in the form of any interaction, including the use of a finger, a stylus, or any other tool used to cause navigation by interacting with an interactive user interface. In example various embodiments, the navigation control system 150 communicates with the client device 110, the third party server(s) 130, and networked system 102. In various embodiments, the navigation control system 155 is implemented on the server side on application server 140. In these embodiments, the navigation control system 155 interacts and communicates with navigation control system 150 via the network 104. The navigation control system 150 will be discussed further in connection with FIG. 2 below.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The and navigation control system 150 could also be implemented as standalone software programs, which do not necessarily have networking capabilities.

Further, while the network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 can also be implemented as standalone software programs, which do not necessarily have networking capabilities.

Figure 2:
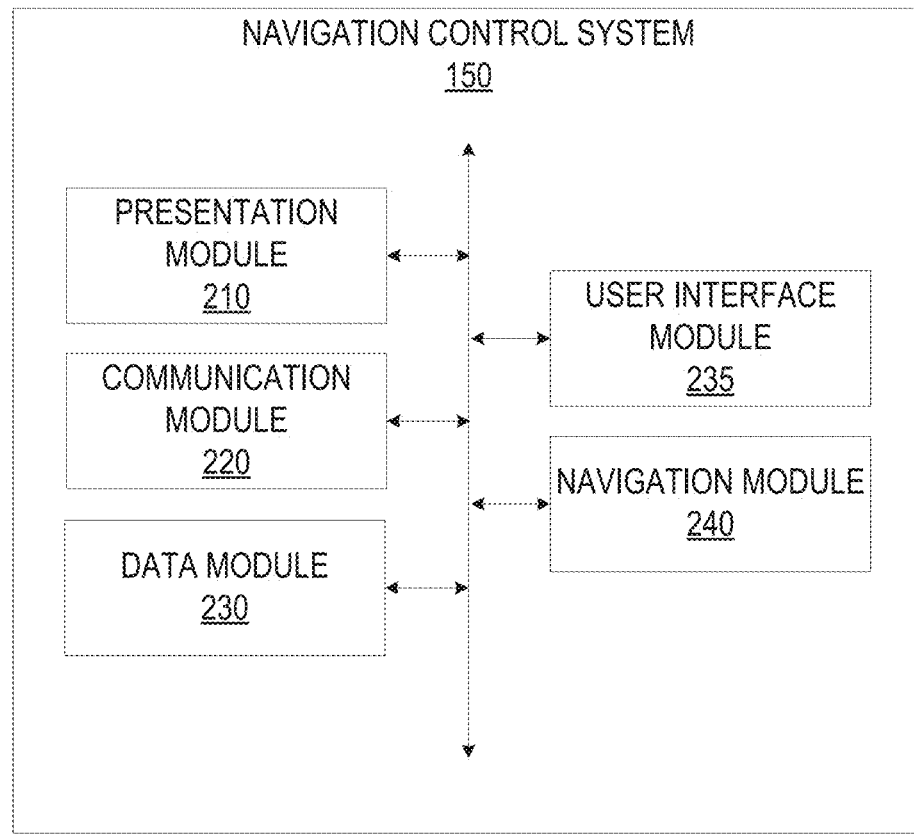
FIG. 2 is a block diagram illustrating an example embodiment of a navigation control system, according to some example embodiments.

FIG. 2 is a block diagram of a navigation control system 150 that provides functionality for user navigation on a device using a single touch motion. In various embodiments, the navigation control system 150 includes a presentation module 210, a communication module 220, data module 230, and a navigation module 240. All, or some, of the modules 210-240 of FIG. 2 communicate with each other, for example, via a network coupling, shared memory, and the like. It will be appreciated that each module can be implemented as a single module, combined into other modules, or further subdivided into multiple modules. Other modules not pertinent to example embodiments can also be included, but are not shown. Further, in some embodiments, one or more of modules 210, 220, 230, and 240, or any or all aspects of navigation control system 150 may be performed on client device 110 (shown in FIG. 1) in lieu of, and/or in conjunction with, application server 140.

In various embodiments, the presentation module 210 provides various presentation and user interface functionality operable to interactively present (or cause presentation) and receive information from the user. For instance, the presentation module 210 can cause presentation of a navigation icon or menu on a user interface of a user device, such as client device 110. In various implementations, the presentation module 210 presents or causes presentation of information (e.g., visually displaying information on a screen, acoustic output, haptic feedback). The presentation module 210 may interact with the navigation control system 155 to present information accessed from database 126 in response to user interaction at a user interface. Interactively presenting information is intended to include the exchange of information between a particular device and the user. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 210 provides many other user interfaces to facilitate functionality described herein. Further, it will be appreciated that "presenting" as used herein is intended to include communicating information or instructions to a particular device that is operable to perform presentation based on the communicated information or instructions.

The communication module 220 provides various communications functionality. For example, the communication module 220 provides network communication such as communicating with the networked system 102, the client device 110, and the third party server(s) 130. The communication module 220 communicates real time information from third party servers 130, navigation control system 155, and application servers 140 in response to user input at the client device 110. In an example, as the user navigates through the presented information on the client device 110, the user may select a selectable element, corresponding data associated from the selectable element are accessed from third party servers 130 or severs associated with the networked system 102 and respective databases such as database(s) 126. In various example embodiments, the network communication can operate over wired or wireless modalities.

The data module 230 provides functionality to access historical data and current data, each of which include, for example, user history input, navigation control parameters, user preference, and other data. In some embodiments, the historical data and the current data can be stored in a data storage drive associated with client device 110 in addition to the database(s) 126 and accessed by the data module 230 in communication with the navigation system 155. In various embodiments, the data module 230 stores the user history input, navigation control parameters, and user preference in the data storage drive of client device 110 or the database(s) 126. Further, in some embodiments, data module 230 communicates with navigation control system 155 to provide pre-caching or pre-fetching operations associated with retrieving and storing data likely to be used by the user and/or navigation control system 150 such as, for example, top portions of web pages, or thumbnail images of same, that are peers of a current web page being accessed by the user.

In various embodiments, the user interface module 235 provides functionality to receive real-time navigation input data from a user interface of a smart phone (e.g., a single-touch user input or a single-touch followed by a continuous stream of touch-drag input captured by a haptic sensor of the smart phone). Specifically, the user interface module 235 receives information at the client device 110 including user gesture input to control navigation. Further, the user interface module 235 in association with the data module 230 presents user interface input parameters of various navigation parameters such as icon position, sensitivity, resistance, and the like.

The navigation module 240 provides functionality to navigate through information being presented on a device based on a user's tap, hold, and drag input at an interactive user interface. Navigation of information presented on the device can be in the form of navigation between frames within a carousel, navigation between web pages of a browser, navigation between applications within an operating system, and the like. Navigation carousels used herein are intended to include a list of frames or pages, which can be scrolled back and forth within a single website. The direction of the navigation scrolling can be in any direction on a Cartesian coordinate, including horizontal, vertical, diagonal, and the like. Carousels allow multiple pieces of content to occupy a single space. One page out of the list of pages in the carousel is presented to the user at a time. The user can browse through the remaining pages in the list of pages in the carousel by scrolling through a navigation interface. In an example embodiment, the navigation module 240 navigates through the carousel pages based on navigation control parameters including icon placement, direction, speed, sensitivity, and resistance. The functionality of the navigation module 240 will be discussed further in connection with FIG. 3 below.

Figure 3:
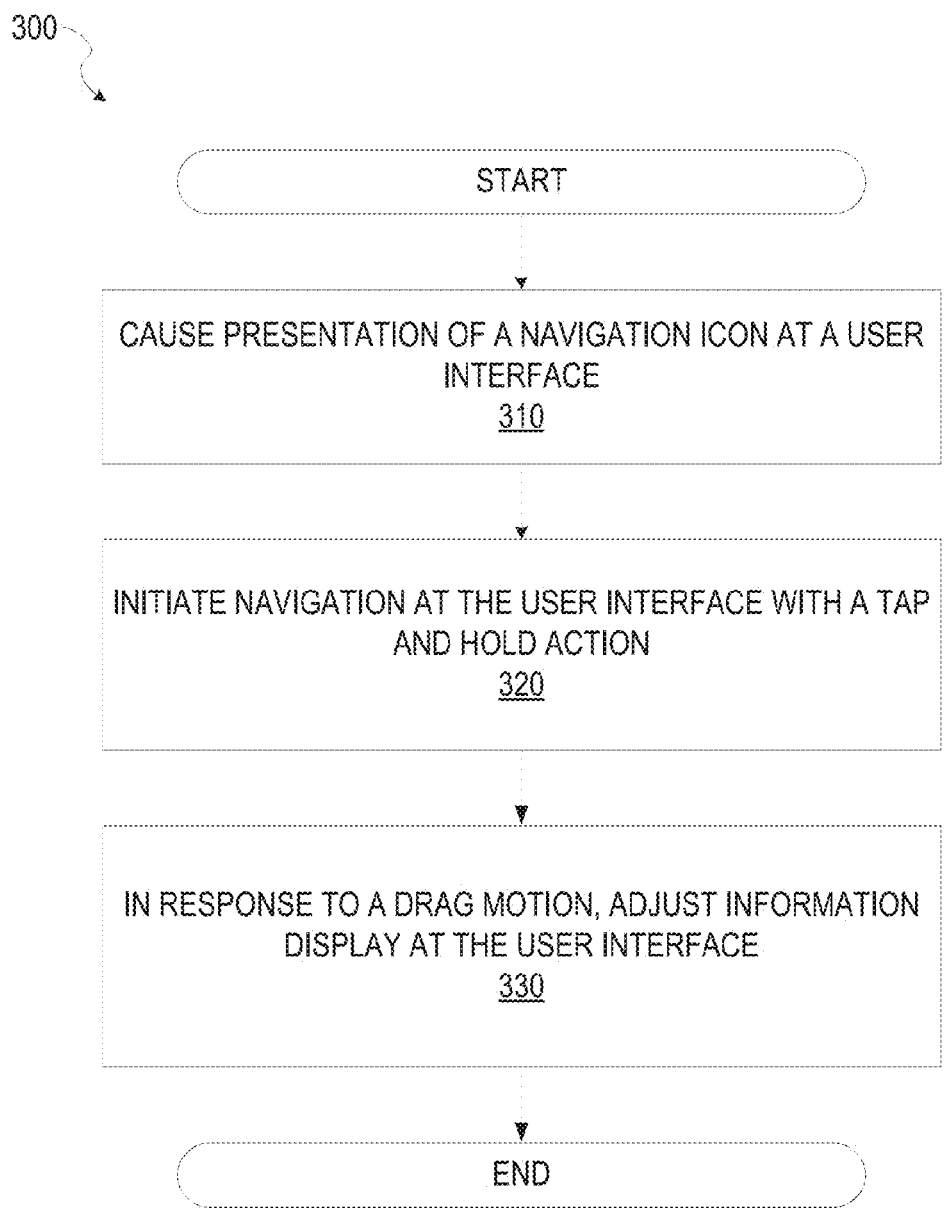
FIG. 3 is a flow diagram illustrating an example method for centralized control for mobile navigation, according to some example embodiments.

FIG. 3 is a flow diagram illustrates an example method 300 for controlling navigation via a user interface. The operations of method 300 can be performed by components of the navigation control system 150, and are so described below for the purpose of illustration.

At operation 310, the presentation module 210 causes presentation of a navigation icon at a user interface of a client device 110. The navigation icon creates a virtual representation of a joystick with joystick-like movement (e.g., enabling movement in a 2-D or 3-D motion, including left, right, up, down, diagonally, and the like). In an example, the navigation icon is displayed as a semi-transparent circle proximate a default position at one of the lower corners that can depend on whether the device is set up for right handed or left handed navigation. In an example, the navigation icon is displayed in the lower right corner of the user interface on client device 110 (e.g., the default position reflects convenience for a right-handed user's thumb). In other embodiments, the icon may be of any shape and may be positioned anywhere on the screen of the user device, such as in a lower left corner of the user interface (e.g., convenient for a left-handed user's thumb). Further, the position, shape, and amount of transparency of the icon is configurable based on user preference. In yet other embodiments, presentation of the navigation icon is displayed for a predetermined amount of time when the user first accesses information. In an example, when a user loads a webpage, the navigation icon is visually perceptible for the first five seconds, then visually fades away from view after five seconds. The functionality provided by the navigation icon remains accessible even after the navigation icon has faded into the background, away from user view. In this way, the presence of a navigation icon may alert the user of the functionality provided to navigate through the information but may be hidden as to not take up space on the screen of a user device.

At operation 320, the navigation module 240 initiates navigation at the user interface with a tap and hold action. The navigation module 240 receives a user input at the user interface of the client device 110. The user input comprises of a single-touch motion, resulting in a seamless navigation. In an example, the user uses a finger to tap and hold within the boundary of the navigation icon. The navigation is initiated by the tap and hold within the boundary. Where the user initially taps and holds at a location outside the boundary of the navigation icon, navigation is not initiated. The boundaries are configurable, and may be the size of a finger print or as large as the whole screen of the client device 110.

At operation 330, in response to a drag motion, following the tap and hold action without releasing the hold action, the presentation module 210 adjusts information display at the user interface. The information display can be in the form of content on a single webpage, content between webpages, content between applications, and the like. These pages may be presented within a carousel like format, where each page may be scrolled for full view. Navigation can be achieved by continually holding the tap and hold action, followed by dragging the hold in the desired direction of navigation. The drag motion initially starts within the boundaries of the navigation icon and can move outside the boundary of the navigation icon. The tap and hold action, and drag motion input within the navigation icon boundary allows the system to navigate between tabs of the browser or between pages within a "carousel" of a website (e.g., navigation carousel with a list of frames or pages, which can be scrolled in horizontal order back and forth within a single website). In some embodiments, the carousel of a website is stored in the application server 140 or third party server 130 and loaded onto the client device 110 once the user access the website. In some example embodiments, the direction of the carousel is from left to the right, screening through a first page to a second page and so forth of the carousel or a first page to a second page and so forth of the browser. The touch of the gesture is not released while navigating by adjusting the movement of the finger. Release of the touch at any time halts the navigation. In response to the user input, the presentation module 210 adjusts the content that is displayed in the user interface on the client device 110.

Figure 4:
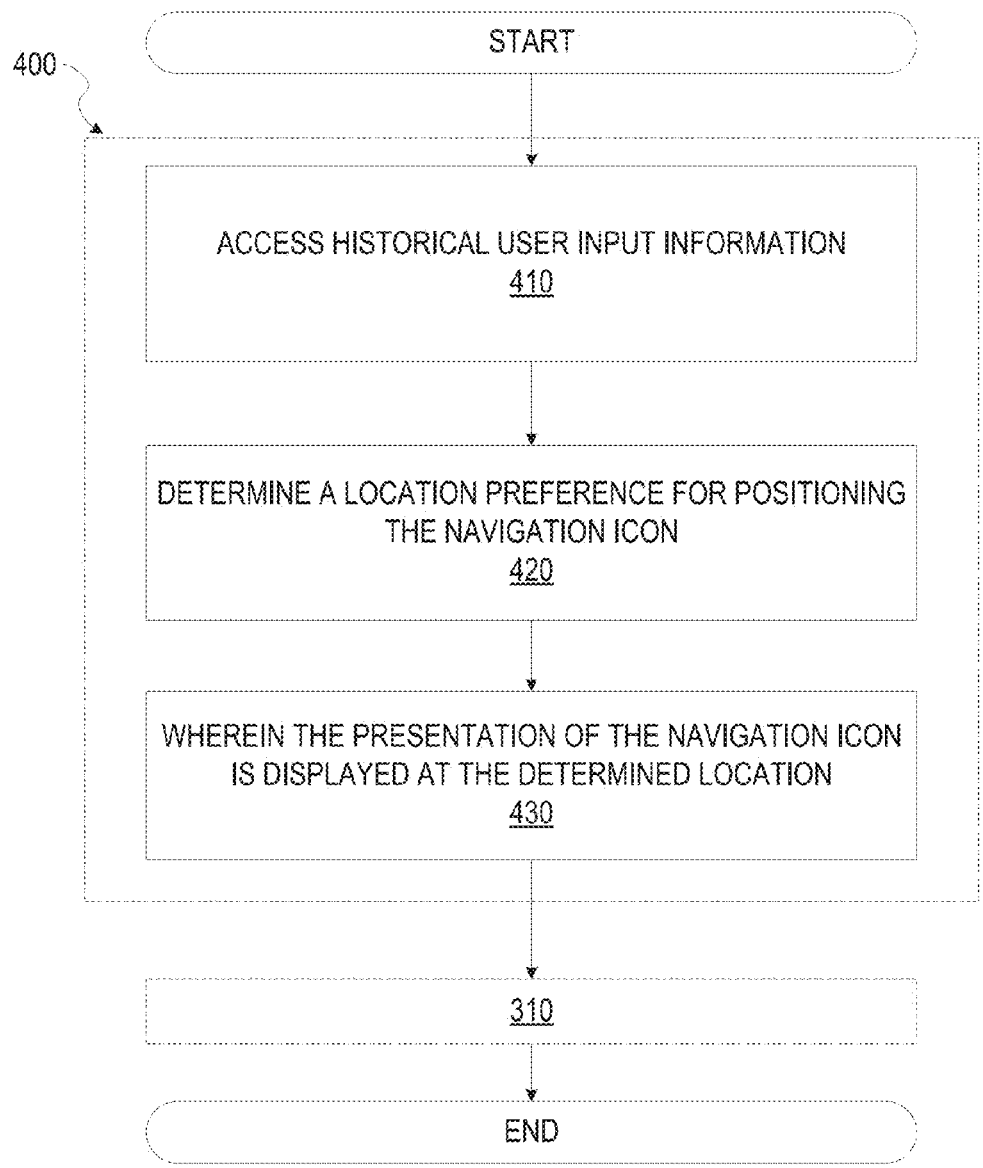
FIG. 4 is a flow diagram illustrating further example operations of the example method for centralized control for mobile navigation, according to some example embodiments.

FIG. 4 is a flow diagram illustrating an example method 400 for determining a location preference for placing the navigation icon using historical user input information. The navigation control system 150 can set the default position and placement of the icon based on user preference.

At operation 410, the data module 230 accesses historical user input information and navigation parameter rules (e.g., navigation icon position, speed, direction, resistance, sensitivity, and the like) from a data storage drive associated with client device 110 and/or database 126. In some embodiments, navigation parameter rules are stored on the data storage drive of a mobile device associated with the application executing the navigation control. Historical user input information includes the position in which the user initiates the tap and hold action and also the direction in which the user often drags or swipes during navigation. Once the application with the navigation control system 150 is stored on the device, the application may continue to collect and store the user input information for determining a location preference for the navigation icon that best suits the specific user's navigation habit based on the historical user input information. The icon placement may be set at a default position when the application is first initiated on the device, but as the user's input information is accumulated, the input information may be used to determined specifically where to best place the icon navigation to better accommodate the user, as fully described below in association with operation 420. Other parameters including speed, direction, resistance, sensitivity are also updated according to the user input information. Alternatively, the user input information may already be stored by another application on the device and is accessed by the navigation control system 150.

At operation 420, the navigation module 240 determines a location preference for positioning the navigation icon using the historical user input information. Location preference of the icon is determined based on the where the user starts the tap and hold and which direction the user swipes. The navigation module 240 determines user preference by analyzing user input history from a database from the manner and direction which the user currently swipes or has swiped in the past (e.g., measured by a percentage). In an example, if the user usually initiates the tap and hold position on the right side of the screen for ninety percent of the time), the user is determined to be right hand dominant and therefore placement of the navigation icon would be on the right side of the screen of the device. Further, the direction of the hold and drag motion is determined. For example, where the user often swipes right, the end position of the drag motion is to the right relative to the initial tap and hold. Where the user often swipes left, the user initially taps and holds, and drags the hold to left, ending at a position to the left of the initial tap and hold action. In this way, a determination of a location preference for positioning the navigation icon fine tunes the positioning specifically for individual users, accommodating for different size hands and placements for different users. In other embodiments, the location for positioning the navigation icon is determined by a user selectable setting such as lower-right, lower-left, upper-right, upper-left, and the like.

At operation 430, the presentation of the navigation is displayed at the determined location preference. Where the user is determined to be right hand dominant and usually swipes to right the navigation icon is placed at the lower right hand corner with a predetermined space between the icon and the edge of the right-side screen in order to allow the user to have room to swipe right with the right hand. In other embodiments, the user can individually customize the position based on user preference depending on the way that the user's finger is naturally positioned or rests on the mobile device.

In various embodiments, the navigation module 240 adjusts the information displayed at the user interface at a speed associated with the speed of the input drag motion. The navigation module 240 calculates the speed based on the position and direction of the user's finger movements. In some example embodiments, there is a relational speed in which the carousel moves in relation to the displacement length in which the finger moves. For instance, when the finger has displaced a relatively short distance, the speed at which the page moves is slower when compared to a longer finger displacement in distance. On the other hand, a longer change in distance of the finger results in a higher speed at which the pages displayed on the user interface moves compared to a shorter change in distance. In other words, where the drag motion is slow, the carousel scrolling in response is slow. Also, where the drag motion speeds up, the carousel scrolling in response also speed up relative to the drag motion speed. In other embodiments, the speed of the carousel scrolling is dependent upon the location of the input relative to the location of the screen. For example, where the input starts near the middle of the screen and drags to the edge of the screen, the speed of carousel scrolling is faster where the input is at the edge of the screen when compared to the middle of the screen. For example, a user taps and holds near the middle of the screen, and swipes right to the edge of a screen. The speed of the carousel scroll near the middle of the screen is slower when compared to the speed scroll near the edge of the screen, even though the speed of the drag motion remains constant throughout. In this way, the information display is adjusted at a speed associated with the location of the drag motion within the user interface.

In various embodiments, the navigation module 240 adjusts the information displayed at the user interface at a sensitivity associated with a pixel sensitivity based on user preference. The sensitivity of the navigation determines the responsiveness of the movement of the carousel to the corresponding finger input. The sensitivity, which is the relationship between the user gesture input variable and the navigation response output variable, is configured based on a pixel count of the user input displacement. In an example, the tap and hold action followed by a drag motion, the drag motion displacing a specific number of pixels corresponds to a single page scroll. For instance, if the user taps and hold and drags the finger by three pixels, the navigation control system 150 scrolls to the next page. In comparison, a less sensitive system would require the drag motion to displace ten pixels in order to scroll the equivalent one page. The sensitivity parameter identifies the relationship between the user gesture input variable and the navigation response output variable, and may be tunable based on user preference. The sensitivity parameter can be as responsive as a single pixel of movement for every corresponding page scroll, or any number of pixels. In this way, the sensitivity parameters are designed to accommodate the mechanics of each finger. Some users prefer using the thumb or navigate through web pages, whereas others prefer using the index fingers, and therefore can adjust the sensitivity accordingly.

In various example embodiments, the resistance of the navigation determines the change in sensitivity in relation to the distance the finger moves. In other words, the further out from the point of origin the finger moves, the less sensitive the navigation output response. A less sensitivity output results in more pixels required to scroll through a page. The resistance parameter lends a springy effect to the way the interface navigates through the pages. In an example, when the user taps and hold then adjusts the finger, the navigation output response is more sensitive by moving through the pages faster than compared to when the finger is dragged further away from the initial position. As the finger is dragged to a position further away from the initial position, more pixels of finger displacement are required to navigate through the pages. As a result, the resistance parameter allows for a more natural feel, much like navigating with a joystick. In other embodiments, the resistance of navigation may be reversed. In other words, the sensitivity and number of pixels to generate a page of movement may be increased the farther the input is dragged away from the initial position. As such, the user may move through a greater number of pages per unit motion the farther they drag in a particular direction.

In various example embodiments, a control mechanism of the navigation module 240 allows for both vertical and horizontal navigation. In one example embodiment, pages along the x-axis may correspond to top categories, while pages along the y-axis correspond to subcategories of the top categories. In another example embodiment, the navigation mechanism controls navigation where there are tiered level of pages within the browser or tiered level of pages within a web page. In this example, the user can tap and hold to navigate vertically or horizontally. In another example, the user can tap and hold and drag or subtly move the finger to control the navigation mechanism through the hierarchy of the pages.

In another example embodiment, a multi-dimensional navigation mechanism controls navigation by controlling both the navigation within a single webpage and between web pages. In one example embodiment, where the web page is larger than the device screen, the multi-dimensional navigation controls for the scrolling within the web page using the tap and hold mechanism. After the boundary of the web page is reached, the tap and hold mechanism will move on to controlling the screening between pages of the carousel or pages of a browser.

In various example embodiments, the contents of the top of each page within the hierarchy of the carousel are pre-cached. Pre-cache of the contents of the top of each page allows that portion of the content to be viewable when the user is scrolling through the pages (e.g., the contents of the top of each page are pre-loaded and locally stored in the memory of client device 110). The cached contents are stored in database 126 (shown in FIG. 1) or pre-cached locally on client device 110 and accessed by the data module 230 for presentation during navigation events (e.g., as apart of the carousel of pages). In some embodiments, where there is a large number of pages (e.g., measured by a threshold), the number of pages that are pre-cached may be limited to, for example, avoid problems of burdening the performance overhead of the user's device. In this way, large amount of content can be navigated through quickly without having the burden of completely locally storing the full content of each page on the memory of the client device 110. Where the data content is not stored locally on the client device 110 the data module 230 in communication with the navigation control system 155 may access database 126 to load the full content of the page, in response to user selection of the page for full view.

Example User Interfaces

Figure 5:
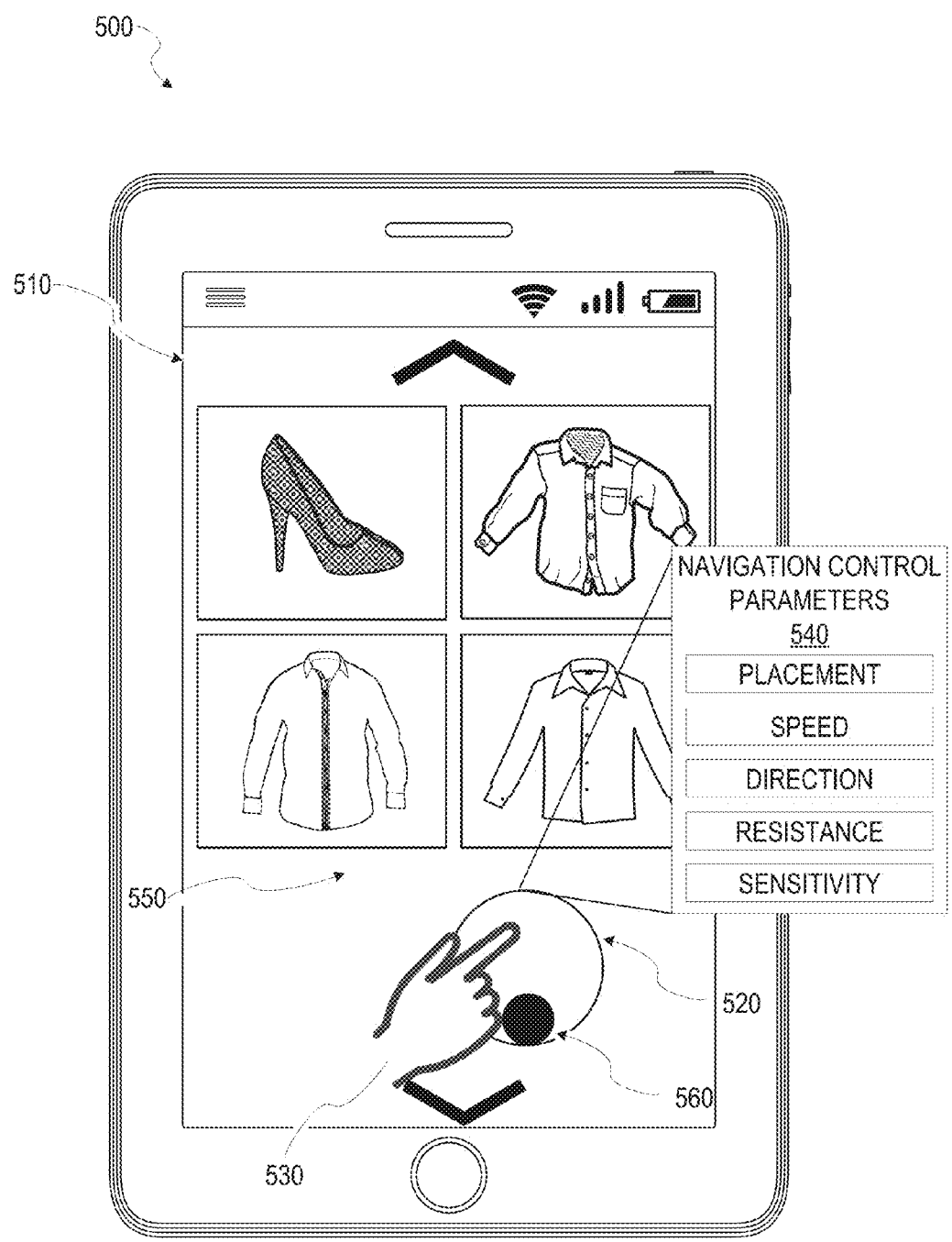
FIG. 5 is a user interface diagram depicting various example user interfaces for navigation, according to some example embodiments.

FIGS. 5-6 depict example user interfaces for navigation control based on user input and interactively presenting information to the user. Although FIGS. 5-6 depict specific example user interfaces and user interface elements, these are merely non-limiting examples and many other alternate user interfaces and user interface elements can be generated by the presentation module 210 and presented to the user. It will be noted that alternate presentations of the displays of FIGS. 5-6 include additional information, graphics, options, and so forth; other presentations include less information, or provide abridged information for ease of illustration.

FIG. 5 depicts an example device 500 (e.g., a smart phone) displaying an example user interface 510 that includes a navigation icon 520, according to some example embodiments. In some embodiments, device 500 may be similar to client device 110 (shown in FIG. 1). In various example embodiments, the presentation module 210 causes presentation of the navigation icon 520 to the user via user interface 510. For instance, the presentation module 210 communicates, to the device 500, instructions to present the navigation icon 520 semi-transparently overlayed (e.g., superimposed) upon a web page currently being viewed by the user. In some instances, the instructions include navigation control parameters 540, accessed by the data module 230, processed by the navigation module 240, generated and presented by the presentation module 210, such as the position or placement of the icon, speed, direction resistance and sensitivity related to user navigation.

In example embodiments, a user input 530 taps and holds within the boundaries of the navigation icon 520. The navigation icon 520 is semi-transparent and ever present on the user interface. The boundaries of navigation icon 520 can be represented by the boundaries of the physical navigation icon as presented or the boundaries can effectively be larger then the physical navigation icon. The boundaries of the navigation icon determine the location where an initial tap and hold input and initiate navigation. During a tap and hold action (e.g., while continuously holding the icon), the user can adjust the movement of the finger by dragging the finger a specific direction, speed, or displacement to navigate through the pages of the carousel 550. The navigation icon 520 includes a position indicator 560, showing direction of the current navigation. Position indicator 560 is placed down within the navigation icon 530, showing the direction of the carousel is currently scrolling down, reflecting the displacement of the input 530. The navigation module 240, in response to the user input information display at the user interface, navigates through the pages of the carousel based existing parameter rules of resistance and sensitivity. As the user navigates from one page or item to the next (e.g., navigation carousel containing a list of pages which can be scrolled by the user horizontally or vertically back and forth from page to page within a single page), the presentation module 210 displays the top portions of the associated pages. Displaying the top portion of the associated page during a navigation scroll decreases the amount of processing power required to render the whole page view. During a navigation scroll, the priorities of the content being displayed at each page may depend on the speed of the scroll. These navigation control parameters 540 can be dynamically adjusted automatically based on user preference. Alternatively, the user can adjust these parameters as desired.

FIGS. 6A-6B depict an example device 600 (e.g., a smart phone) displaying an example user interface that includes navigation icon 650, carousel pages 640 and 680, user gesture input 620 and 630, and user drag direction 670, according to some example embodiments. In some embodiments, device 600 is similar to computing device 110 (shown in FIG. 1) and/or device 500 (shown in FIG. 5). In the example embodiment, the user initiates navigation between web pages by a tap and hold gesture within the boundaries of the navigation icon circle 650. The user may navigate, or traverse pages of the carousel, by continuing the hold and dragging the finger in direction 670 (e.g., to the right). The dragging motion initially starts within the boundaries of navigation icon 650 (e.g., as illustrated in FIG. 6A) and can move outside the boundary of the navigation icon 650 (e.g., as illustrated in FIG. 6B).

In the example embodiment, upon releasing the interface (e.g., discontinuing the press, hold, and drag event), the navigation control system 150 displays the current page of the carousel. In other words, the release event leaves the user viewing the current page of the carousel. As such, in response to the dragging motion of the input 620 to the position 630, the pages of the carousel can be navigated from page 640 to page 680. In response to the drag motion, the position indicator changes from position 655 to 665, reflecting the current direction of the scroll being displaced to the right. The speed at which the pages from 640 to 680 moves depends on the speed, sensitivity, and resistance parameters of the navigation control 540. These parameters can be adjusted by the user or adjusted automatically based on user input history. Navigation through the pages of the carousel ends when the user lifts the input 630 and the hold is released.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 2-6 are implemented in some embodiments in the context of a machine, mobile device, and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 7:
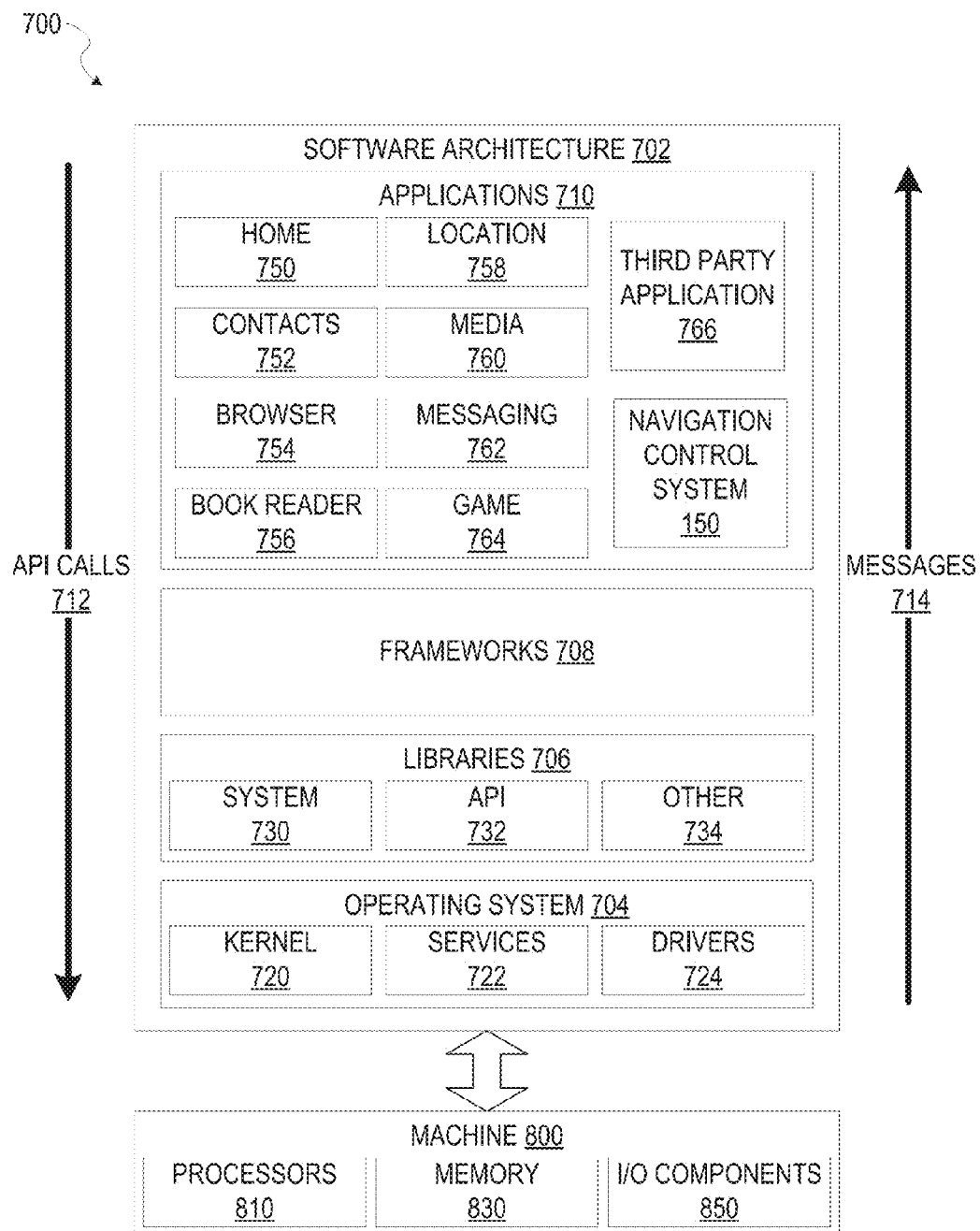
FIG. 7 is a block diagram illustrating an example of a software architecture that may be installed on a machine, according to some example embodiments.

FIG. 7 is a block diagram 700 illustrating an architecture of software 702, which may be installed on any one or more of the devices described above. FIG. 7 is merely a non-limiting example of a software architecture, and it will be appreciated that many other architectures may be implemented to facilitate the functionality described herein. The software 702 may be implemented by hardware such as machine 800 of FIG. 8 that includes processors 810, memory 830, and I/O components 850. The processors 810 include executable instructions of the software architecture 702, including implementation of the methods, modules and no forth of FIGS. 2-6. In this example architecture, the software 702 may be conceptualized as a stack of layers where each layer may provide a particular functionality. For example, the software 702 includes layers such as an operating system 704, libraries 706, frameworks 708, and applications 710. Operationally, the applications 710 invoke application programming interface (API) calls 712 through the software stack and receive messages 714 in response to the API calls 712, according to some implementations.

In various implementations, the operating system 704 manages hardware resources and provides common services. The operating system 704 includes, for example, a kernel 720, services 722, and drivers 724. The kernel 720 acts as an abstraction layer between the hardware and the other software layers in some implementations. For example, the kernel 720 provides memory management, processor management (e.g., scheduling), component management, networking, security settings, among other functionality. The services 722 may provide other common services for the other software layers. The drivers 724 may be responsible for controlling or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 706 provide a low-level common infrastructure that may be utilized by the applications 710. The libraries 706 may include system 730 libraries (e.g., C standard library) that may provide functions such as memory allocation functions, string manipulation functions, mathematic functions, and the like. In addition, the libraries 706 may include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries e.g., SQLite to provide various relational database functions), web libraries (e.g., WebKit to provide web browsing functionality), and the like. The libraries 706 may also include a wide variety of other libraries 734 to provide many other APIs to the applications 710.

The frameworks 708 provide a high-level common infrastructure that may be utilized by the applications 710, according to some implementations. For example, the frameworks 708 provide various graphic user interface (GUI) functions, high-level resource management, high-level location services, and so forth. The frameworks 708 may provide a broad spectrum of other APIs that may be utilized by the applications 710, some of which may be specific to a particular operating system or platform. The framework 708 can provide high-level support for haptic based user input processing functions that can be used in aspects of the navigation control system 150.

In an example embodiment, the applications 710 include a home application 750, a contacts application 752, a browser application 754, a book reader application 756, a location application 758, a media application 760, a messaging application 762, a game application 764, and a broad assortment of other applications such as third party application 766. The application 710 also includes the navigation control system 150 in the form of an application executed on a mobile device. According to some embodiments, the applications 710 are programs that execute functions defined in the programs. Various programming languages may be employed to create one or more of the applications 710, structured in a variety of manners, such as object-orientated programming languages (e.g., Objective-C, Java, or C++) or procedural programming languages (e.g., C or assembly language). In a specific example, the third party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 766 may invoke the API calls 712 provided by the mobile operating system 704 to facilitate functionality described herein.

Example Machine Architecture and Machine-Readable Medium

Figure 8:
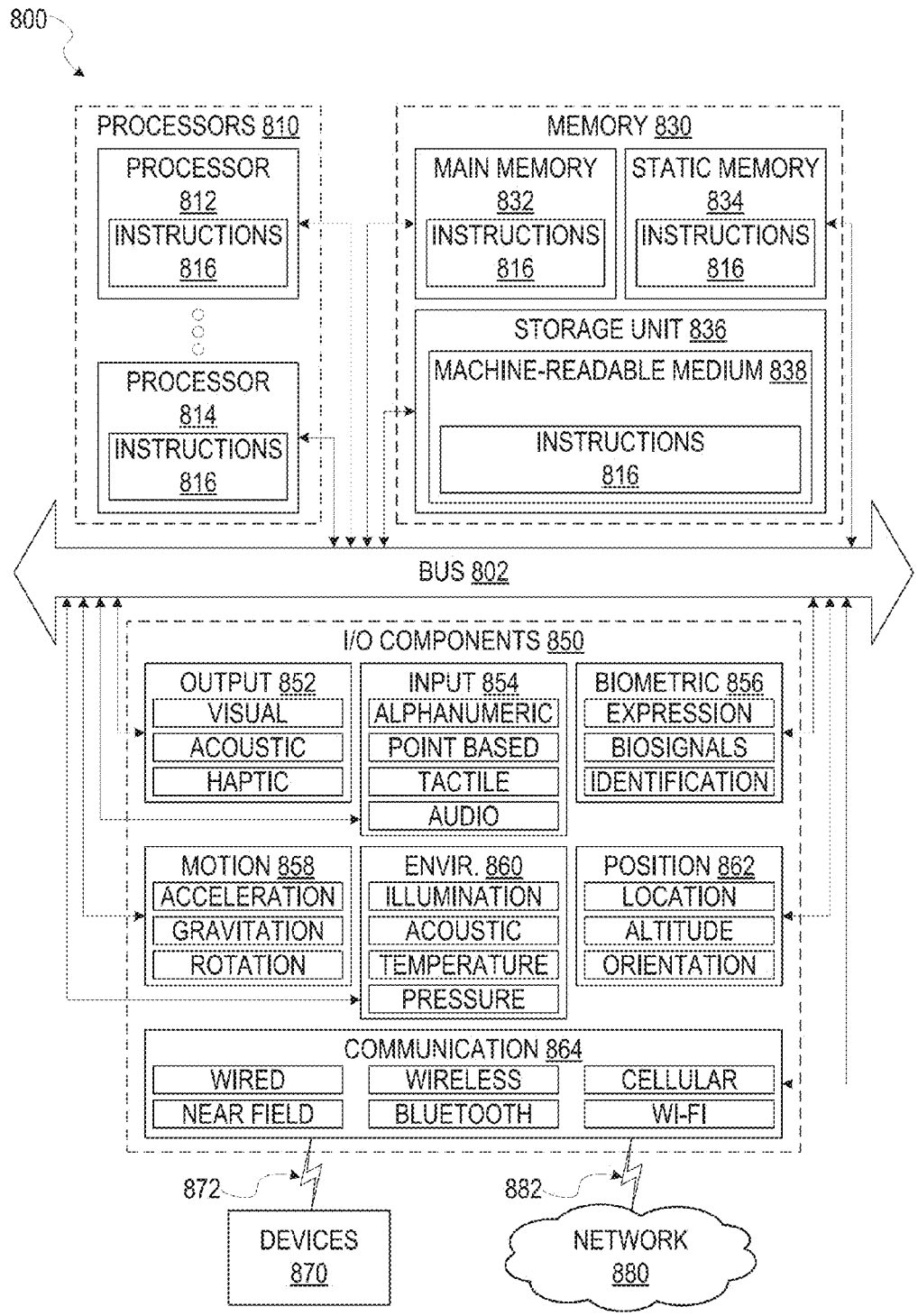
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example the instructions may cause the machine to execute the flow diagrams of FIGS. 4-5. Additionally, or alternatively, the instructions may implement the presentation module 210, communication module 220, data module 230, and navigation module 240 of FIG. 2, and so forth. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein. Instructions 816 may include functionalities to perform operations of the navigation system 150.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX) Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor; and
memory coupled to the processor and storing instructions that, when executed by the processor, causes the system to perform operations comprising:
causing presentation of a navigation icon at a user interface, wherein the navigation icon includes a representation of a joystick;
initiating navigation between a plurality of pages at the user interface with a single tap and hold action, wherein the tap and hold action occurs within a boundary of the navigation icon, and wherein the navigation icon includes a position indicator within the boundary of the navigation icon showing a direction of current navigation;
in response to a drag motion, following the single tap and hold action without releasing the hold action, adjusting information display at the user interface, wherein the drag motion is initiated within the boundary of the navigation icon and displaced using a dragging motion following a trajectory from inside the boundary of the navigation icon to outside of the boundary of the navigation icon.

2. The system of claim 1, wherein:
the navigation icon is presented at a default location, the default location being based on the hand dominance of a user.

3. The system of claim 1, the operations further comprise:
accessing historical user input information;
determining a location preference for positioning the navigation icon using the historical user input information; and
wherein the presentation of the navigation icon is displayed at the determined location preference.

4. The system of claim 3, wherein:
the historical user input information includes the position of the tap and hold action and the direction of the drag motion relative to the position of the tap and hold action.

5. The system of claim 1, wherein:
the information display is adjusted at a speed associated with a speed of the drag motion.

6. The system of claim 1, wherein:
the information display is adjusted at a speed associated with the location of the drag motion within the user interface.

7. The system of claim 1, wherein:
the information display is adjusted at a sensitivity associated with a pixel sensitivity based on a user preference.

8. The system of claim 7, wherein:
the sensitivity is variable depending on the displacement of the drag motion.

9. A method comprising:
causing, by a computer system, presentation of a navigation icon at a user interface, wherein the navigation icon includes a representation of a joystick;
initiating, by the computer system, navigation between a plurality of pages at the user interface with a single tap and hold action, wherein the tap and hold action occurs within a boundary of the navigation icon, and wherein the navigation icon includes a position indicator within the boundary of the navigation icon showing a direction of current navigation; and
in response to a drag motion, following the single tap and hold action without releasing the hold action, adjusting, by the computer system, information display at the user interface, wherein the drag motion is initiated within the boundary of the navigation icon and displaced using a dragging motion following a trajectory from inside the boundary of the navigation icon to outside of the boundary of the navigation icon.

10. The method of claim 9, wherein:
the navigation icon is presented at a default location, the default location being based on the hand dominance of a user.

11. The method of claim 9, further comprising:
accessing historical user input information;
determining a location preference for positioning the navigation icon using the historical user input information; and
wherein the presentation of the navigation icon is displayed at the determined location preference.

12. The method of claim 11, wherein:
the historical user input information includes the position of the tap and hold action and the direction of the drag motion relative to the position of the tap and hold action.

13. The method of claim 9, wherein:
the information display is adjusted at a sensitivity associated with a pixel sensitivity based on a user preference; and
adjusting the sensitivity based on the displacement of the drag motion.

14. A non-transitory machine-readable storage medium comprising instructions that, when executed by one or more processors of a machine, cause the machine to perform operations comprising:
causing presentation of a navigation icon at a user interface, wherein the navigation icon includes a representation of a joystick;
initiating navigation between a plurality of pages at the user interface with a single tap and hold action, wherein the tap and hold action occurs within a boundary of the navigation icon, and wherein the navigation icon includes a position indicator within the boundary of the navigation icon showing a direction of current navigation; and
in response to a drag motion, following the single tap and hold action without releasing the hold action, adjusting information display at the user interface, wherein the drag motion is initiated within the boundary of the navigation icon and displaced using a dragging motion following a trajectory from inside the boundary of the navigation icon to outside of the boundary of the navigation icon.

15. The non-transitory machine-readable storage medium of claim 14, wherein the operations further comprise:
accessing historical user input information;
determining a location preference for positioning the navigation icon using the historical user input information; and
wherein the presentation of the navigation icon is displayed at the determined location preference.

* * * * *